US007719709B2

(12) United States Patent
Akiyama

(10) Patent No.: US 7,719,709 B2
(45) Date of Patent: May 18, 2010

(54) PRINT CONTROL APPARATUS, PRINT CONTROL SYSTEM, PRINT CONTROL METHOD, AND RECORDING MEDIUM HAVING PRINT CONTROL PROGRAM

(75) Inventor: Chiaki Akiyama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1007 days.

(21) Appl. No.: 11/381,666

(22) Filed: May 4, 2006

(65) Prior Publication Data

US 2006/0279776 A1 Dec. 14, 2006

(30) Foreign Application Priority Data

Jun. 13, 2005 (JP) ............................. 2005-172355

(51) Int. Cl.
*G06F 3/12* (2006.01)
(52) U.S. Cl. ...................... 358/1.15; 358/1.1; 358/1.13; 358/1.14
(58) Field of Classification Search ................. 358/1.1, 358/1.13–1.15
See application file for complete search history.

(56) References Cited

U.S. PATENT DOCUMENTS

| 6,552,813 | B2 * | 4/2003 | Yacoub ...................... 358/1.1 |
| 6,804,022 | B2 | 10/2004 | Fujiwara et al. |
| 6,829,059 | B1 | 12/2004 | Kimura |
| 7,231,435 | B2 | 6/2007 | Ohta |
| 7,577,662 | B2 * | 8/2009 | Kasatani ..................... 707/10 |
| 2004/0252331 | A1 * | 12/2004 | Wei ........................ 358/1.15 |
| 2005/0036348 | A1 * | 2/2005 | Aoyama ....................... 365/49 |
| 2005/0128515 | A1 * | 6/2005 | Ohno ........................ 358/1.15 |
| 2006/0139675 | A1 * | 6/2006 | Lee et al. .................... 358/1.13 |
| 2006/0250638 | A1 * | 11/2006 | Wang et al. ................ 358/1.15 |
| 2007/0180082 | A1 * | 8/2007 | Abraham et al. ............ 709/223 |
| 2007/0204045 | A1 * | 8/2007 | Shima ....................... 709/226 |

FOREIGN PATENT DOCUMENTS

| JP | 2000-99288 | 4/2000 |
| JP | 2000-103144 | 4/2000 |
| JP | 2002-356502 | 12/2002 |
| JP | 2003-131839 | 5/2003 |
| JP | 2003-241939 | 8/2003 |
| JP | 2004-46705 | 2/2004 |
| JP | 2004-246620 | 9/2004 |

* cited by examiner

*Primary Examiner*—Benny Q Tieu
*Assistant Examiner*—Quyen Ngo
(74) *Attorney, Agent, or Firm*—Oblon, Spivak, McClelland, Maier & Neustadt, L.L.P.

(57) ABSTRACT

A print control apparatus which transmits print data to a printing apparatus according to a print instruction for a logical printer. The print control apparatus includes a logical printer information management unit which manages logical printer information that is provided for each logical printer and is used to store information including a network address of a printing apparatus corresponding to a logical printer, a printing apparatus search unit which searches for printing apparatuses connected to a network, and a print data transmitting unit which transmits print data to a network address of a printing apparatus found by the printing apparatus search unit if no network address corresponding to a logical printer specified in a print instruction is registered in the logical printer information.

14 Claims, 8 Drawing Sheets

FIG.4

| LOGICAL PRINTER NAME | PORT NAME | NETWORK ADDRESS | DESTINATION PRINTER NAME | PORTLESS PRINTER MODE |
|---|---|---|---|---|
| PRINTER A | PrinterPort_11.22.33.44 | 11.22.33.44 | PRINTER A | NO |
| PRINTER B | PrinterPort_11.22.33.55 | 11.22.33.55 | PRINTER B | NO |
| PRINTER C | Portless | N/A | N/A | YES |
| PRINTER D | Portless | N/A | N/A | YES |

SELECT A PRINTER

DOCUMENT: *** *** –DOCUMENT1.DOC

SELECT A DESTINATION PRINTER FROM AVAILABLE PRINTER LIST BELOW, AND THEN CLICK ON PRINT BUTTON.

PRINTER LIST — 1431a

| MODEL NAME | PRINTER NAME | COMMENT | ADDRESS | STATUS |
|---|---|---|---|---|
| ***** CX3000 | RNP753326 | LOCATION:... | 133.139.172.133 | CAUTION |
| ***** CX9000 | RNP8077FF | | 133.139.172.164 | CAUTION |
| ***** NX96e | ***** ***** NE96e | | 133.139.172.153 | ENERGY-SAVING MODE |
| ##### ### C320 | RNP6F5488 | | 133.139.172.236 | CAUTION |
| ##### ### C385 | RNP8B22A8 | | 133.139.172.64 | AVAILABLE |

PRINTER INFORMATION   UPDATE

PRINT   CANCEL

| LOGICAL PRINTER NAME | PORT NAME | NETWORK ADDRESS | DESTINATION PRINTER NAME | PORTLESS PRINTER MODE |
|---|---|---|---|---|
| PRINTER A | PrinterPort_11.22.33.44 | 11.22.33.44 | PRINTER A | NO |
| PRINTER B | PrinterPort_11.22.33.55 | 11.22.33.55 | PRINTER B | NO |
| PRINTER C | Portless | 11.22.33.66 | N/A | YES |
| PRINTER D | Portless | N/A | N/A | YES |

1421

PRINT CONTROL APPARATUS, PRINT CONTROL SYSTEM, PRINT CONTROL METHOD, AND RECORDING MEDIUM HAVING PRINT CONTROL PROGRAM

BACKGROUND OF THE INVENTION

1. Field of the Invention

The present invention generally relates to a print control apparatus, a print control system, a print control method, and a recording medium having a print control program, and more particularly relates to a print control apparatus, a print control system, a print control method, and a recording medium having a print control program which transmit print data to a printing apparatus according to a print instruction to a logical printer.

2. Description of the Related Art

To send a print instruction from a personal computer (PC) to a printer (including a multifunction peripheral: MFP) which is connected to a network, identification information, such as an IP address, of the target printer should be registered beforehand for a printer port of the PC. The PC identifies the destination of print data by referring to the registered information.

[Patent document 1] Japanese Patent Application Publication No. 2002-366502

Nowadays, however, because of the spread of portable devices such as notebook computers and personal digital assistants (PDA), users may want to print on different printers according to circumstances. For example, it is quite possible that a user brings a notebook PC, which is normally connected to a local area network (LAN) in his/her office, to another office and wants to print on a printer connected to a LAN in that office. In such a situation, the identification information of the printer should be registered in the notebook PC. However, changing settings every time may be bothersome and increase the risk of problems caused by setting errors.

SUMMARY OF THE INVENTION

The present invention may provide a print control apparatus, a print control system, a print control method, and a recording medium having a print control program that substantially obviate one or more problems caused by the limitations and disadvantages of the related art.

A preferred embodiment of the present invention may particularly provide a print control apparatus, a print control system, a print control method, and a recording medium having a print control program which can flexibly select a destination printer according to circumstances.

To achieve these and other advantages in accordance with an aspect of the present invention, a print control apparatus which transmits print data to a printing apparatus according to a print instruction to a logical printer includes a logical printer information management unit which manages logical printer information that is provided for each logical printer and is used to store information including a network address of a printing apparatus corresponding to a logical printer, a printing apparatus search unit which searches for printing apparatuses connected to a network, and a print data transmitting unit which transmits print data to a network address of a printing apparatus found by the printing apparatus search unit if no network address corresponding to a logical printer specified in a print instruction is registered in the logical printer information.

BRIEF DESCRIPTION OF THE DRAWINGS

FIG. 4 is an example of a port configuration information management table in the embodiment according to the present invention;

FIG. 6 is a drawing of an example of a destination printer list screen;

FIG. 8 is an example of a port configuration information management table in which a network address of a destination printer is registered for a portless printer.

DETAILED DESCRIPTION OF THE PREFERRED EMBODIMENTS

In the following, embodiments of the present invention are described in detail with reference to accompanying drawings.

Figure 1:
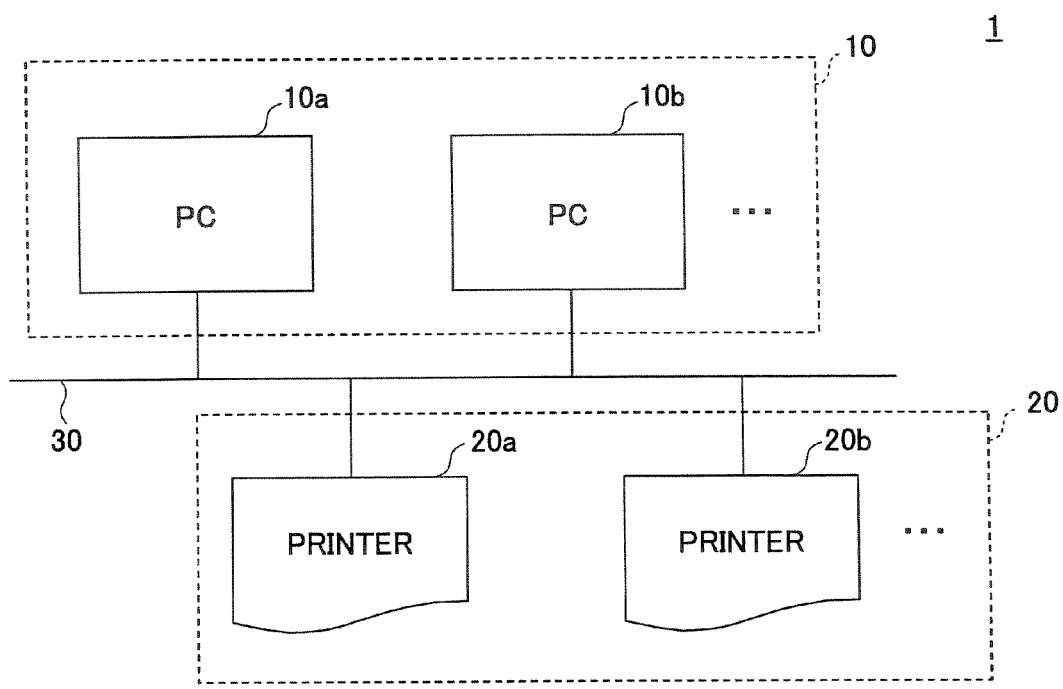
FIG. 1 is a block diagram showing an example of a configuration of a printing system in an embodiment according to the present invention.

FIG. 1 is a block diagram showing an example of a configuration of a printing system in an embodiment according to the present invention. As shown in FIG. 1, a printing system 1 includes PCs 10 including a PC 10a, a PC 10b and so on, and printers 20 including a printer 20a, a printer 20b and so on which are connected to each other by a network 30. In this embodiment, the printers 20 perform printing according to print requests from the PCs 10.

Figure 2:
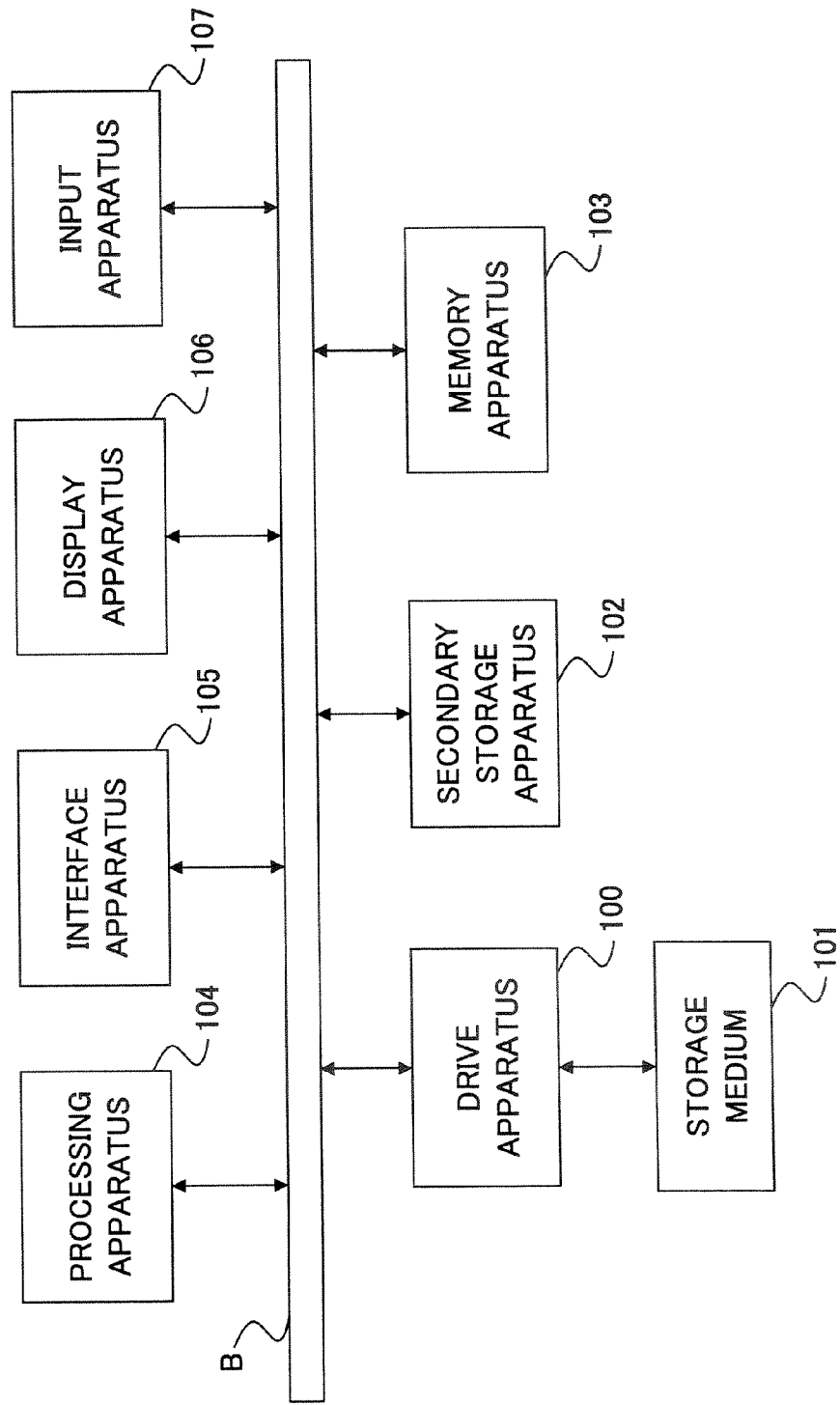
FIG. 2 is a block diagram showing an example of a hardware configuration of a PC in the embodiment according to the present invention.

FIG. 2 is a block diagram showing an example of a hardware configuration of a PC 10 in the embodiment. As shown in FIG. 2, the PC 10 includes a drive apparatus 100, a secondary storage apparatus 102, a memory apparatus 103, a processing apparatus 104, an interface apparatus 105, a display apparatus 106, and an input apparatus 107 which are connected to each other by a bus B.

Programs which provide functions (including an input/output unit, a control unit, and an installation image creating unit) assigned to the PC 10 are provided in a storage medium 101. The storage medium 101 may be a CD-ROM. When the storage medium 101 containing the programs is loaded in the drive apparatus 100, the programs are installed in the secondary storage apparatus 102 from the storage medium 101 via the drive apparatus 100.

The secondary storage apparatus 102 stores the installed programs as well as necessary files and data. The memory apparatus 103 retrieves the programs from the secondary storage apparatus 102 and temporarily stores those programs when starting the programs is instructed. The processing apparatus 104 performs the tasks assigned to the PC 10 according to the programs loaded in the memory apparatus 103. The interface apparatus 105 provides an interface connecting the PC 10 to the network 30 shown in FIG. 1. The display apparatus 106 displays graphical user interfaces (GUI) of the programs. The input apparatus 107 includes, for example, a keyboard and a mouse and is used for inputting various operating instructions.

Figure 3:
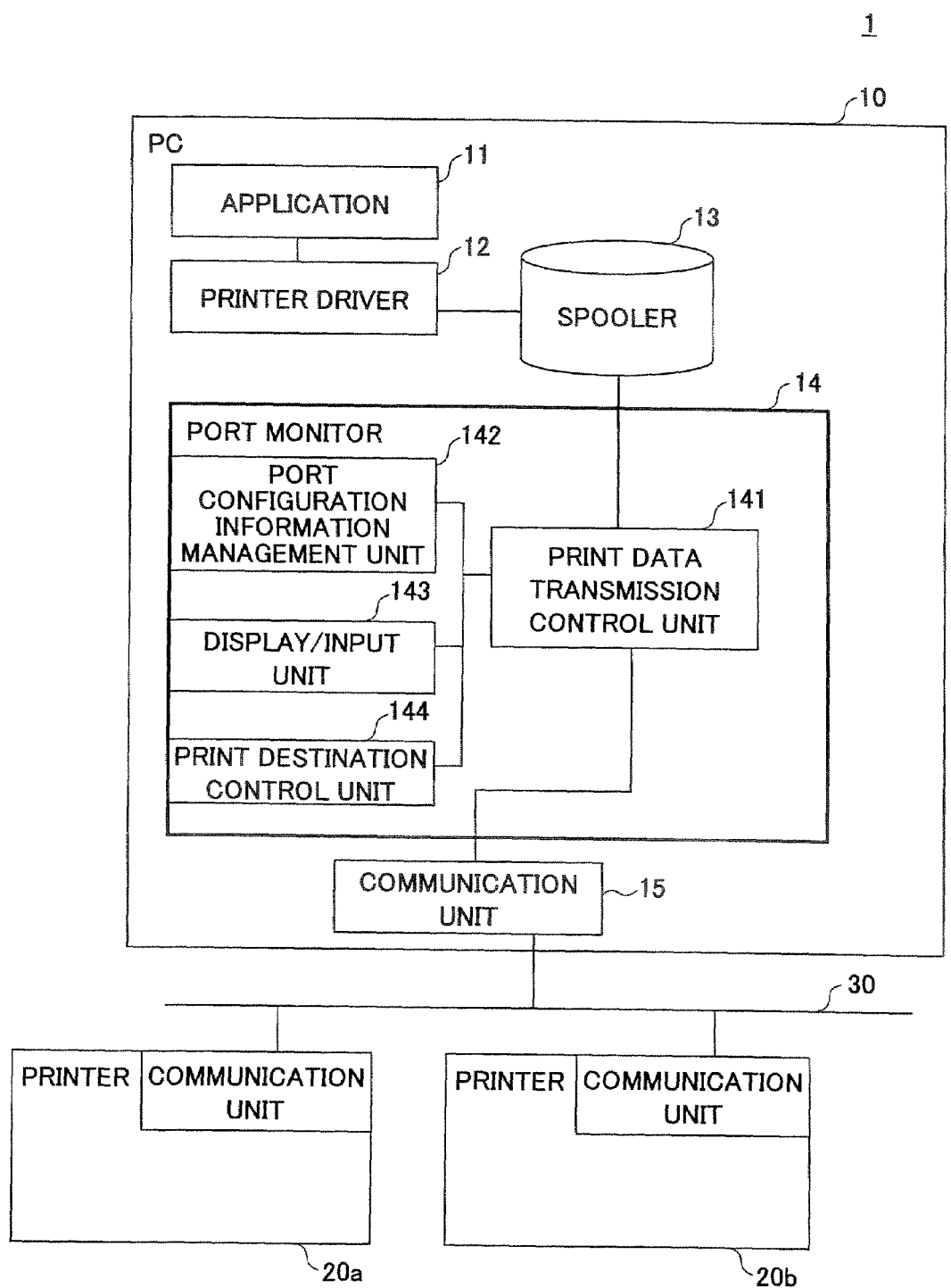
FIG. 3 is a block diagram showing an example of a functional configuration of the printing system in the embodiment according to the present invention.

FIG. 3 is a block diagram showing an example of a functional configuration of the printing system in the embodiment according to the present invention. As shown in FIG. 3, a PC 10 in the printing system 1 includes, for example, an application 11, a printer driver 12, a spooler 13, a port monitor 14, and a communication unit 15. Although not shown in FIG. 3, it is assumed that an operating system (OS) such as a Windows (registered trademark) operating system is running on the PC 10.

The application 11 may be any application such as a word processing program, a spreadsheet, or an image viewer which has a function for printing electronic data (hereafter called application data) handled (for example, displayed or edited) by such an application.

The printer driver 12, in response to an instruction from the application 11, generates print data from application data, in a format such as the Page Description Language (PDL) which is understandable to the printers 20. The printer driver 12 then outputs the print data to the spooler 13.

The spooler 13 spools the print data, identifies the port monitor 14 based on a port which is associated with a logical printer in the OS, and outputs the port name and the print data to the port monitor 14.

The port monitor 14 transmits the print data, which are received from the spooler 13, through the communication unit 15 to a printer 20 which is specified as the destination printer. The communication unit 15 controls the network communications via the network 30.

In FIG. 3, the port monitor 14 includes a print data transmission control unit 141, a port configuration information management unit 142, a display/input unit 143, and a print destination management unit 144.

The print data transmission control unit 141, which is a main control unit in the port monitor 14, transmits print data to the printer 20 according to an instruction from the spooler 13.

The port configuration information management unit 142 holds a port configuration information management table used for managing port configuration information of logical printers installed in the PC 10.

FIG. 4 is a table showing an example of a port configuration information management table in the embodiment according to the present invention. As shown in FIG. 4, a port configuration information management table 1421 manages port configuration information of ports in the PC 10. The port configuration information contains the following data items for each logical printer: logical printer name, port name, network address of destination printer, destination printer name, and portless printer mode. The port monitor 14 identifies a destination printer and its network address which correspond to a logical printer or a port by using the port information management table 1421.

The port configuration information management table 1421 in this embodiment contains a data item used to determine whether a logical printer is a portless printer. A portless printer is a printer for which information for identifying a destination printer, such as a network address and a destination printer name, is not specified. This also means that a port for a portless printer is a logical port. The data item can take one of the two values: YES or NO. YES indicates that the logical printer is a portless printer.

In FIG. 4, logical printers C and D are portless printers.

As described above, the port configuration information management table 1421 in this embodiment can manage a logical printer or a port for which no network address and destination printer name are specified. The use of this table is described later in detail.

The display/input unit 143 displays a GUI such as a dialog box on the display apparatus 106 in the PC 10 and performs control based on inputs from the input apparatus 107.

The print destination management unit 144 manages the network addresses of destination printers.

Figure 5:
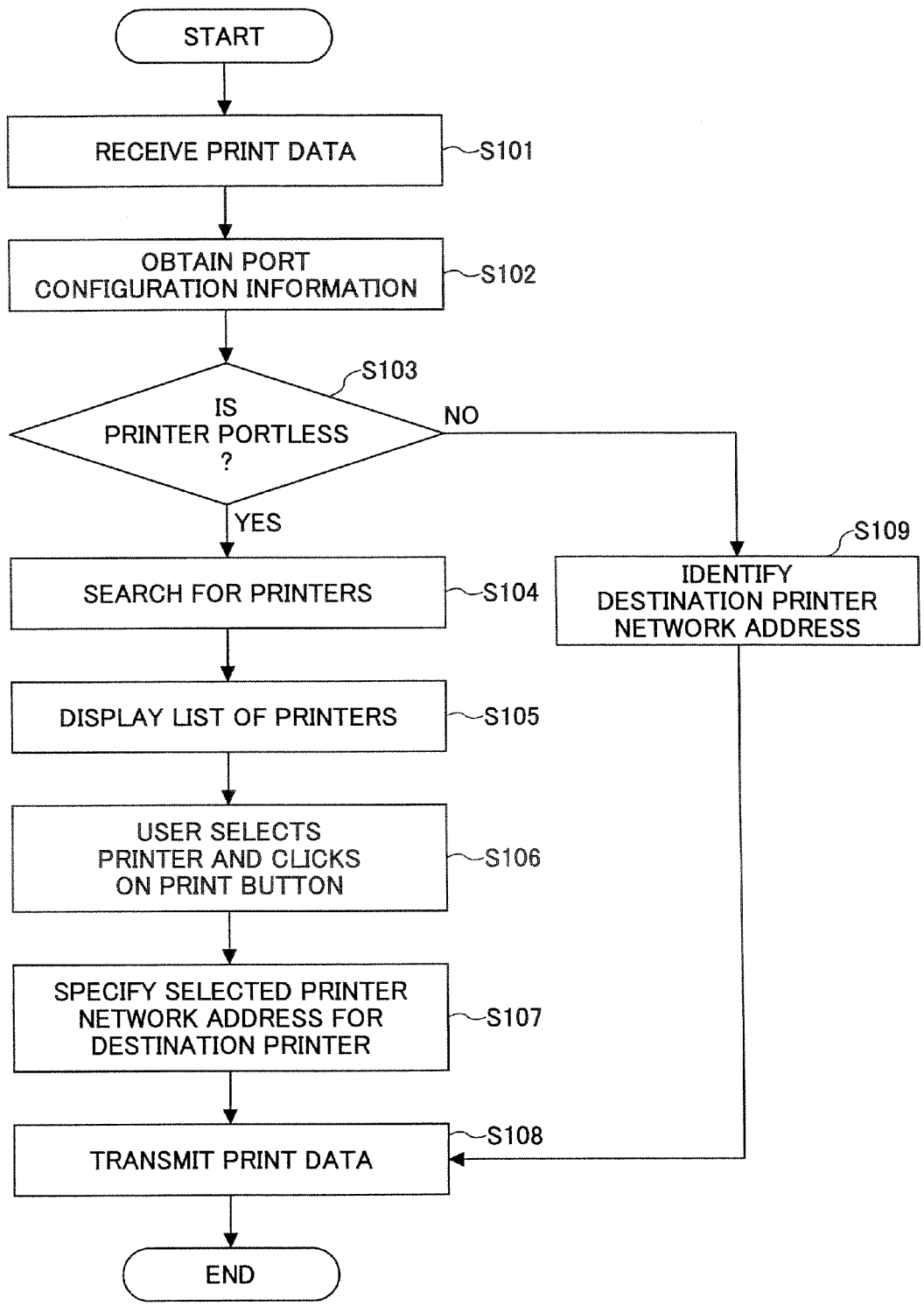
FIG. 5 is a flowchart showing processes of a port monitor in a first embodiment.

In the following, processes of the port monitor 14 in the PC 10 shown in FIG. 3 are described. FIG. 5 is a flowchart showing processes of a port monitor in a first embodiment.

When a user instructs the application 11 to print a document, the printer driver 12 generates print data and the spooler 13 spools the print data. The port monitor 14 receives the print data and a port name from the spooler 13 (S101).

The print data transmission control unit 141 in the port monitor 14 obtains port configuration information associated with a specified logical printer (hereafter called current logical printer) from the port configuration information management table 1421 (shown in FIG. 4) according to the port name received in step S101 (S102). More precisely, the print data transmission control unit 141 instructs the port configuration information management unit 142 to obtain the port configuration information.

Next, the print data transmission control unit 141 determines whether YES is specified for the portless printer mode in the port configuration information (whether the current logical printer is a portless printer) which is obtained by the port configuration information management unit 142 (S103).

When the current logical printer is not a portless printer (the result of S103 is NO), the print data transmission control unit 141 identifies the destination printer (a destination printer name and its network address) based on the port configuration information of the current logical printer (S109) and transmits the print data to the destination printer (S108).

In the port configuration information table 1421 shown in FIG. 4, NO is specified for each portless printer mode of printer A and printer B. Therefore, for each of the two logical printers, the destination printer can be identified based on the network address and the destination printer name in the port configuration information. In other words, when the current logical printer is printer A or B, the print data are transmitted according to the network address and the destination printer name in the port configuration information.

On the other hand, when the current logical printer is a portless printer (the result of S103 is YES), the print destination management unit 144 searches for all printers 20 in a network and obtains information such as emulation, configuration, and status of each printer. The print destination management unit 144 then determines available printers based on the obtained information and lists those printers as candidate destination printers (S104). For example, nearby printers can be listed by searching a subnet for printers.

To obtain the configuration and status information of printers 20, a method using the simple network management protocol (SNMP) may be used. Also, if a Web service is implemented on the printer 20, an inquiry using the simple object access protocol (SOAP) may be used.

Next, the display/input unit 143 displays the list of available printers 20 (hereafter called a destination printer list screen) on the display apparatus 106 (S105).

FIG. 6 is a drawing of an example of the destination printer list screen. On a destination printer list screen 1431 shown in FIG. 6, a list 1431a lists available printers 20.

When a user selects a destination printer in the list 1431a and clicks on a print button 1431b (S106), the display/input unit 143 obtains the network address of the selected printer and outputs the network address to the print destination management unit 144. The print destination management unit 144 specifies the network address as the destination printer network address (S107). Then, the print destination management unit 144 transmits the print data to the destination printer network address (S108).

In the procedures shown in FIG. 5, the destination printer list screen 1431 is displayed to let the user select a destination if the current logical printer specified by the user is a portless printer. The processes may be configured so that the print destination management unit 144 automatically determines the network address of a destination printer 20 without asking the user. In this case, steps S105 and S106 in FIG. 5 are not required, and the print destination management unit 144 determines a destination printer 20 in step S107.

As described above, the PC 10 in the first embodiment can manage a logical printer for which information for identifying a destination printer, such as a network address and a destination printer name, is not specified (a portless printer). When printing on a portless printer is directed, the PC 10 automatically searches for available printers 20 in a network and prints on one of the available printers.

In other words, setting a printer port as a portless printer in the PC 10 eliminates the need for searching for and setting a network address of a printer 20. This will allow a user to use a printer without knowing its network address.

For example, when the PC 10 is connected to a network in a different office, a user may forget to change destination printer settings and try to print on a printer in his/her own office. Or after coming back to his/her office, the user may try to print on a printer in the different office. Embodiments according to the present invention prevent these problems. Also, embodiments according to the present invention may reduce the workload of changing printer port settings needed, for example, when a network configuration is changed according to office layout changes.

Further, the PC 10 in the first embodiment can be configured so as to display the destination printer list screen 1431 and let a user select a destination printer. Therefore, when two or more printers 20 are connected to a network, a user can print on any printer in the network.

In the port configuration information management table 1421, setting the portless printer mode for each logical printer is required. This setting may be automatically performed when the port monitor 14 is installed. This mechanism enables automatic creation of portless printers and further reduces the workload of setting printer ports.

Figure 7:
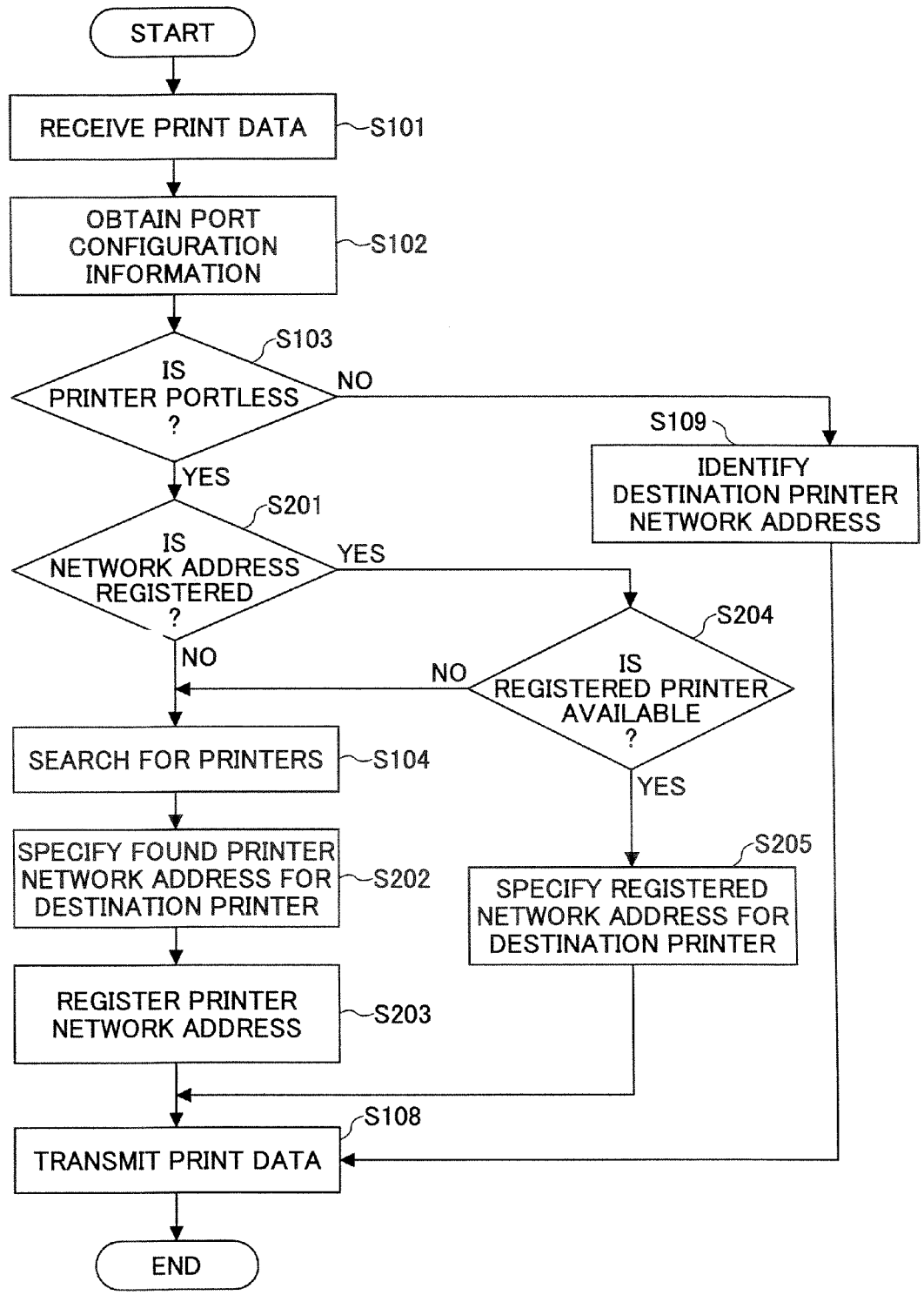
FIG. 7 is a flowchart showing processes of a port monitor in a second embodiment.

FIG. 7 is a flowchart showing processes of a port monitor in a second embodiment. Steps in FIG. 7 which correspond to the steps in FIG. 5 have the same step numbers and description of those steps is omitted herein.

In FIG. 7, when the current logical printer is a portless printer (the result of S103 is YES) and a printer 20 found by searching a network is selected as the destination printer, the network address of the destination printer is associated with the portless printer. More precisely, in step S203, the port configuration information management unit 142 registers the network address of the destination printer in the network address field for the portless printer in the port configuration information management table 1421 according to the instruction from the print data transmission control unit 141. The procedures in FIG. 7 may be configured so as to display the destination printer list screen 1431 and let a user select a destination printer 20 as described in steps S105 through S107 in the first embodiment.

FIG. 8 is an example of the port configuration information management table in which a network address of a destination printer is registered for a portless printer. In the port configuration information management table 1421 shown in FIG. 8, the network address for a portless printer C is registered. As described above, in the processes shown in FIG. 7, a network address is registered for a portless printer which has been used once.

If the current logical printer is a portless printer (the result of S103 is YES), the print data transmission control unit 141 determines whether a network address is registered for the portless printer (S201). If the network address is not registered (the result of S201 is NO), the print data transmission control unit 141 performs steps described above: searching for printers 20 in a network (S104); specifying the network address of a printer found by the search as the destination printer network address (S202); and registering the destination printer network address for the portless printer (S203).

On the other hand, if the network address is registered (the result of S201 is YES) for the portless printer, the print data transmission control unit 141 determines through the communication unit 15 whether the registered printer 20 is available (S204). More precisely, the print data transmission control unit 141 determines, for example, whether the registered printer is working normally and whether the registered printer and the PC 10 are in the same network.

Whether the registered printer is working normally may be determined based on the status information of the printer which is obtained via the network. Whether the registered printer and the PC 10 are in the same network (in the same subnet) may be determined by obtaining the network address and subnet of the PC 10 and determining whether the network address of the printer is in the same subnet as that of the PC 10.

If the printer is available (the result of S204 is YES), the print data transmission control unit 141 passes the network address registered in the port configuration information of the specified portless printer to the print destination management unit 144 as the destination printer network address (S205). Then, the print data are transmitted to the destination printer network address (S108).

If the printer is not available (the result of S204 is NO), steps S104, S202, S203, and S108 are performed: available printers 20 are searched for (S104); the network address of a printer found by the search is passed to the print destination management unit 144 (S202); then the destination printer network address is registered as the network address of the specified portless printer in the port configuration information table 1421 (S203).

As described above, in the PC 10 in the second embodiment, once a network address is allocated for a portless printer, the network address for the portless printer is registered in the port configuration information table 1421. When the same portless printer is specified again, the registered network address is used as the destination printer network address. This mechanism eliminates the need for searching for printers again.

In normal circumstances, a user may use the same printer 20 repeatedly. Therefore, it is of no use to search for printers in a network every time when printing is requested. The PC 10 in the second embodiment eliminates the need for this extra workload.

Also, if the printer with the network address registered for a portless printer is not available, the PC 10 searches for available printers again and renews the destination printer network address. This mechanism allows the PC 10 to automatically and flexibly handle situations such as when the PC 10 is connected to a different network, when the configuration of a network to which the PC 10 belongs changes, and when the printer with a registered network address fails.

For example, if a user on the road tries to print on a portless printer for which the network address of a printer in his/her own office is registered, the network address for the portless printer is automatically renewed. Therefore, the user can print on an appropriate printer in a different office.

The present invention is not limited to the specifically disclosed embodiments, and variations and modifications may be made without departing from the scope of the present invention.

The present application is based on Japanese Priority Application No. 2005-172355, filed on Jun. 13, 2005, the entire contents of which are hereby incorporated herein by reference.

What is claimed is:

1. A print control apparatus which transmits print data to a printing apparatus according to a print instruction for a logical printer, comprising:
   a logical printer information management unit configured to manage logical printer information predefined for each of logical printers, the logical printer information including a logical printer name of a corresponding one of the logical printers and an indicator indicating whether the corresponding one of the logical printers is a portless printer that is not associated with any printing apparatus;
   a printing apparatus search unit; and
   a print data transmitting unit configured to determine whether the logical printer specified in the print instruction is a portless printer based on the indicator in the logical printer information, wherein
   if the logical printer specified in the print instruction is a portless printer, the print data transmitting unit is configured to request the printing apparatus search unit to search for printing apparatuses connected to a network and to transmit the print data to a network address of one of the printing apparatuses found by the printing apparatus search unit.

2. The print control apparatus as claimed in claim 1, further comprising:
   a printing apparatus list display unit which displays a list of printing apparatuses found by the printing apparatus search unit, wherein the print data transmitting unit transmits the print data to a network address of a printing apparatus selected from the printing apparatus list.

3. The print control apparatus as claimed in claim 1, wherein the network address to which the print data are transmitted by the print data transmitting unit is registered in the logical printer information as the network address of the logical printer specified in the print instruction.

4. The print control apparatus as claimed in claim 1, wherein
   the printing apparatus search unit obtains status information of the printing apparatuses connected to the network and determines availability of the printing apparatuses based on the status information, and
   the print data transmitting unit transmits the print data to one of the available printing apparatuses if the network address corresponding to the logical printer specified in the print instruction is not registered in the logical printer information.

5. The print control apparatus as claimed in claim 1, wherein the printing apparatus search unit searches for another printing apparatus if the printing apparatus corresponding to the network address registered in the logical printer information of the logical printer specified in the print instruction is not available.

6. The print control apparatus as claimed in claim 1, wherein the printing apparatus search unit searches for printing apparatuses in a same network segment as that of the print control apparatus.

7. A print control system which transmits print data to a printing apparatus according to a print instruction for a logical printer, comprising:
   a logical printer information management unit configured to manage logical printer information predefined for each of logical printers, the logical printer information including a logical printer name of a corresponding one of the logical printers and an indicator indicating whether the corresponding one of the logical printers is a portless printer that is not associated with any printing apparatus;
   a printing apparatus search unit; and
   a print data transmitting unit configured to determine whether the logical printer specified in the print instruction is a portless printer based on the indicator in the logical printer information, wherein
   if the logical printer specified in the print instruction is a portless printer, the print data transmitting unit is configured to request the printing apparatus search unit to search for printing apparatuses connected to a network and to transmit the print data to a network address of one of the printing apparatuses found by the printing apparatus search unit.

8. A print control method which transmits print data to a printing apparatus according to a print instruction for a logical printer, comprising:
   managing logical printer information predefined for each of logical printers, the logical printer information including a logical printer name of a corresponding one of the logical printers and an indicator indicating whether the corresponding one of the logical printers is a portless printer that is not associated with any printing apparatus; and
   determining whether the logical printer specified in the print instruction is a portless printer based on the indicator in the logical printer information; and
   searching for printing apparatuses connected to the network and transmitting the print data to a network address of one of the printing apparatuses found in the printing apparatus search if the logical printer specified in the print instruction is a portless printer.

9. A recording medium having a program embodied therein for causing a computer to transmit print data to a printing apparatus according to a print instruction for a logical printer, said program comprising:
   a logical printer information management code unit configured to manage logical printer information predefined for each of logical printers, the logical printer information including a logical printer name of a corresponding one of the logical printers and an indicator indicating whether the corresponding one of the logical printers is a portless printer that is not associated with any printing apparatus;
   a printing apparatus search code unit; and
   a print data transmitting code unit configured to determine whether the logical printer specified in the print instruction is a portless printer based on the indicator in the logical printer information, wherein
   if the logical printer specified in the print instruction is a portless printer, the print data transmitting code unit is configured to request the printing apparatus search code unit to search for printing apparatuses connected to a network and to transmit the print data to a network address of one of the printing apparatuses found by the printing apparatus search code unit.

10. The recording medium as claimed in claim 9, said program further comprising:

a printing apparatus list display code unit which displays a list of printing apparatuses found by the printing apparatus search code unit, wherein the print data transmitting code unit transmits the print data to a network address of a printing apparatus selected from the printing apparatus list.

11. The recording medium as claimed in claim 9, said program further comprising:

an address registration code unit which registers the network address, to which the print data are transmitted by the print data transmitting step, in the logical printer information as the network address of the logical printer specified in the print instruction.

12. The recording medium as claimed in claim 9, wherein the printing apparatus search code unit of said program obtains status information of the printing apparatuses connected to the network and determines availability of the printing apparatuses based on the status information, and the print data transmitting code unit of said program transmits the print data to one of the available printing apparatuses if the network address corresponding to the logical printer specified in the print instruction is not registered in the logical printer information.

13. The recording medium as claimed in claim 9, wherein the printing apparatus search code unit of said program searches for another printing apparatus if the printing apparatus corresponding to the network address registered in the logical printer information of the logical printer specified in the print instruction is not available.

14. The recording medium as claimed in claim 9, wherein the printing apparatus search code unit of said program searches for printing apparatuses in a same network segment as that of said program.

* * * * *